United States Patent [19]

Motoda et al.

[11] 4,260,319
[45] Apr. 7, 1981

[54] END POSITION CONTROL ROBOT

[75] Inventors: Kenro Motoda, Tokyo; Kensuke Hasegawa, Yokohama, both of Japan

[73] Assignee: Motoda Denshi Kogyo Kabushiki Kaisha, Tokyo, Japan

[21] Appl. No.: 59,373

[22] Filed: Jul. 20, 1979

Related U.S. Application Data

[63] Continuation-in-part of Ser. No. 888,148, Mar. 16, 1978, Pat. No. 4,177,002.

[30] Foreign Application Priority Data

Jul. 28, 1978 [JP] Japan .................... 53-92324

[51] Int. Cl.³ .................... F41F 9/04; B25J 9/00
[52] U.S. Cl. .................... 414/591; 414/589; 414/673; 414/749; 414/917
[58] Field of Search .............. 212/8 A; 414/589, 591, 414/673, 696, 749, 751, 752, 753, 917

[56] References Cited

U.S. PATENT DOCUMENTS

| 2,822,094 | 2/1958 | Greer | 414/749 X |
| 3,352,441 | 11/1967 | Alden | 214/771 |
| 3,482,711 | 12/1969 | Böhme et al. | 212/11 |
| 3,850,307 | 11/1974 | Motoda | 414/917 X |
| 3,995,746 | 12/1976 | Usagida | 414/738 |
| 4,132,318 | 1/1979 | Wang et al. | 414/591 |

FOREIGN PATENT DOCUMENTS 2433954 1/1976 Fed. Rep. of Germany .
1330653 9/1973 United Kingdom .

Primary Examiner—Stephen G. Kunin
Attorney, Agent, or Firm—Blanchard, Flynn, Thiel, Boutell & Tanis

[57] ABSTRACT

An end position control robot constituted by a compound robot comprising a weight control apparatus a weight control robot having a link arm robot and a position control apparatus of a position control robot, both the apparatus being mechanically associated. The weight control apparatus is constructed so as to bear vertical load to control a vertical position and the position control apparatus is constructed in such a manner that a working end portion of the weight control apparatus is moved in a horizontal direction to carry out positioning, which leads to a precise positioning of the end portion of the arm in the case of load being transferred.

6 Claims, 11 Drawing Figures

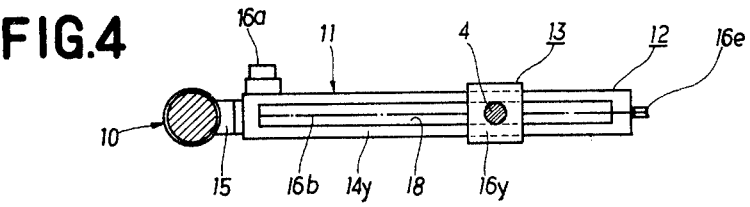
FIG.4
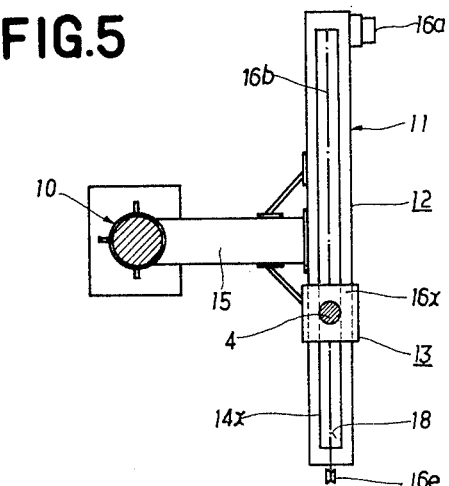
FIG.5
FIG.6
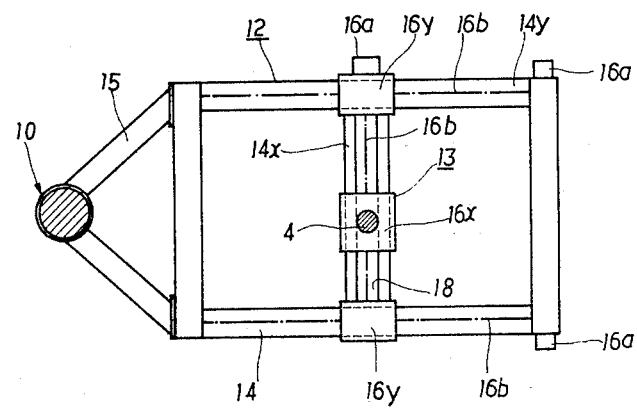

END POSITION CONTROL ROBOT

CROSS-REFERENCE TO RELATED APPLICATION

This application is a continuation-in-part of application Ser. No. 888,148, filed Mar. 16, 1978, now U.S. Pat. No. 4,177,002, issued Dec. 4, 1979.

The present invention relates to an end position control robot constructed in such a manner that the positioning of a normal load supporting point and the positioning of a horizontally moving point are separately controlled in order to enhance accuracy in the positioning during the load transfer.

Conventionally, the robot for transferring loads such as goods, workpieces and tools is, in general, constituted by a link arm robot comprising an erected strut member 101, a rotary driving means 102 mounted on an upper portion of the strut member 101, an extendible and liftable operating arm 103 installed on the rotary driving means 102, and an end operating portion 104 constituted by a support portion for supporting the load at the end of the arm 103 or working tools for working workpieces and the like. Operations for rotating the robot, lifting or lowering the end operating portion 104 or horizontally moving the portion 104 are all carried out by a control means 105 disposed at the strut member 101. However, the weight of the load supported by the end operating portion 104 is not always constant. In accordance with changes in the weight of the load or the moving speed, there is an unfavourably great bending in the operating arm 103 due to inertia. Further, the inertia changes in its value and in this instance, when the end operating portion 104 is transmitted to a designated position by employing predetermined positional data, the position where the load is actually transmitted is different from the predetermined position, which is disadvantageous. The rotary driving of the driving means 102 also causes the accuracy in positioning of the end operating portion 104 to be deteriorated because there is a considerable distance between the rotary driving means 102 and the end operating portion 104. Namely, in the case of the conventional robot, the article is retained in the arm of the robot and is transmitted to an end position. In this instance, the arm of the robot is designed to be operated at its base portion, so that the conventional robot cannot perform a precise position control because of bending of the arm, inertia, rotary mechanisms and the like. When the length of the arm from the driving portion placed at a base portion thereof to the end operating portion becomes larger, the arm must be formed to have a solid structure and also the driving force must be made larger, unfavourably leading to an increase in mechanical inertia and an increase in the size of the machine. Therefore, when the operations for raising the load and simultaneously moving and mounting it onto a predetermined position is intended by the use of the conventional robot, all the operations, in normal cases, have been done only by one robot and a complicated correcting operations have been done by computers and the like in order to give a position control order to the robot. As a result, undesirably, the more complicated the control system of the robot becomes, the more expensive the robot becomes.

The present inventors have made intensive studies with a view to eliminating all the above-mentioned disadvantages and succeeded in developing an end position control robot which is improved in the accuracy of the positioning during load transfer.

Accordingly, it is an object of the present invention to provide an end position control robot which is improved in the accuracy of positioning during the load transfer by sharing and combining abilities and functions in such a manner that both positionings of a supporting point of normal load and of a horizontally moving point are separately controlled.

In order to attain the above-mentioned object, there is provided, according to the present invention, an end position control robot comprising a weight control means of a weight control robot and a position control means of a position control robot, both the means being mechanically associated, wherein the weight control means bears or supports a normally applied load to control positioning of a normal load supporting point in the vertical direction and the position control means controls the positioning of an end operating portion of the weight control means by moving it in the horizontal direction to carry out alignment of the end portion in an accurate manner.

The foregoing and other objects, features and advantages of the present invention will be apparent to those skilled in the art from the following detailed description taken in connection with the accompanying drawings in which:

FIG. 2A is an enlarged plan view showing another embodiment of a driving member;

FIGS. 4 to 6 are schematic plan views of embodiments of the present invention;

FIG. 8 is a side view, FIG. 9 is a front view, and FIG. 10 is a plan view taken in the direction shown by an arrow A—A of FIG. 8.

Figure 1:
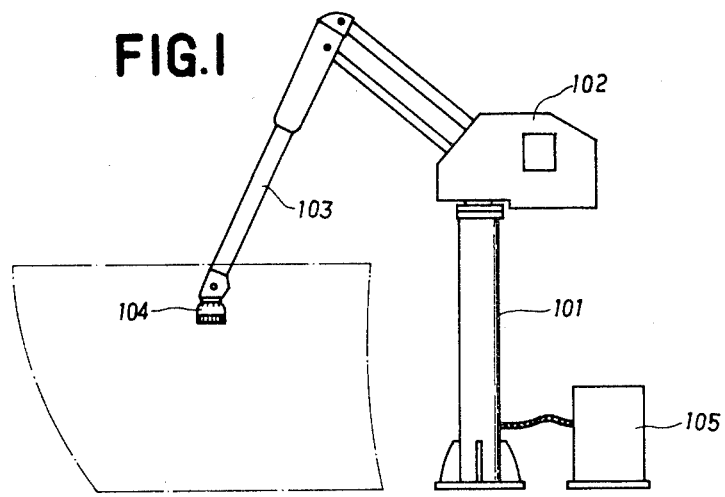
FIG. 1 is a side view roughly showing a conventional robot.
Figure 2:
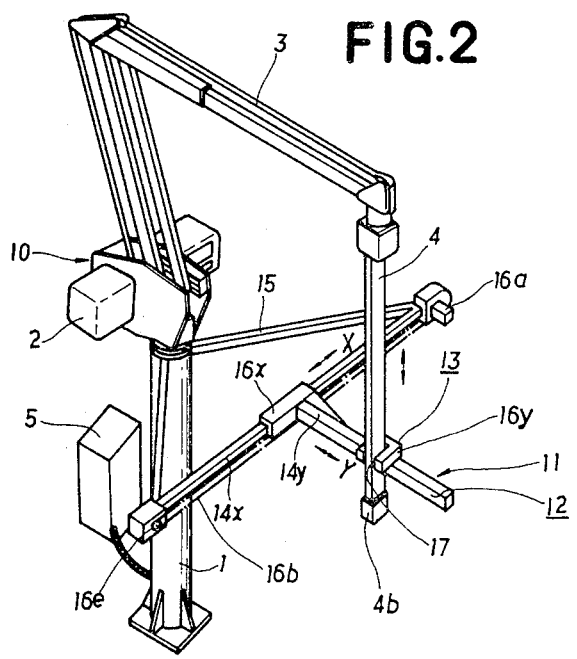
FIGS. 2 and 3 are perspective views respectively showing an embodiment of the present invention.
Figure 2:
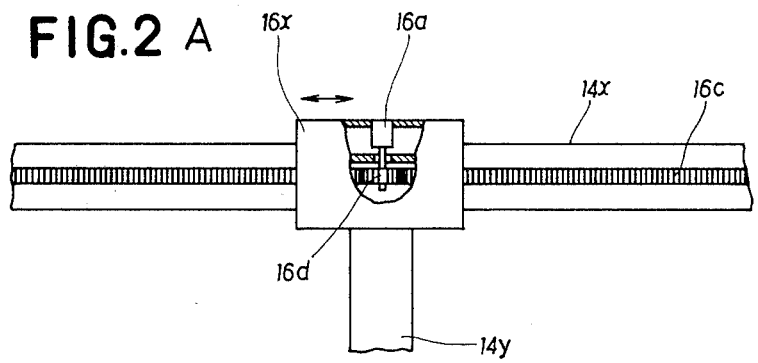

Referring now to FIG. 2, there is shown a perspective view of a combination of two robots practically in use and embodying the present invention. In an embodiment illustrated in FIG. 2, a weight control means 10 of a weight control robot and a position control means 11 of a position control robot are combined to constitute the present invention.

The weight control means 10 is rotatably driven at an upper portion of a strut member 1 and bears or supports a normally applied load. The weight control means is provided with a driving means 2 for controlling the positioning in the vertical direction of a supporting point of the normally applied load. On said driving means 2, an extendible and liftable operating arm 3 is mounted. On an end of the arm 3 is mounted a vertically movable lifting portion 4 having at its lower end a load support portion 4b. In this embodiment, the operating arm 3 is constructed so as to have a form of a link structure and the lifting portion 4 attached to the end of the arm 3 is constituted by a long and vertically extending rod, for example, a square bar. This vertical rod is connected to the end portion of the arm 3 and supported in a vertical disposition. To a lower end of the vertical rod 4, an operating portion 4a is detachably attached. This operating portion 4a may be a load supporting portion, working tools of workpieces and the like.

The position control means 11 comprises a guide means 12 and a driving control means 13. The guide means 12 is constructed by a guide rail 14y of a guide shaft extending in a Y-axis direction, as shown by an arrow ⟵⟶ Y, and a guide rail 14x of a guide shaft extending in an X-axis direction, as shown by an arrow ⟵⟶ X. These guide rails are supported through a support member 15 by the strut member 1. The driving control means 13 comprises a cursor 16x to which the guide rail 14y is attached and which travels on the guide rail 14x and a cursor 16y which engages with the lifting portion 4 of the operating arm 3 and which travels on the guide rail 14y.

A driving member 16a of the cursor 16x is disposed at the end of the guide rail 14x and a string member 16b is stretched on the guide rail 14x. The cursor 16a is designed to travel on the guide rail 14x by winding the string member 16b. Another method for moving the cursor 16x on the guide rail is illustrated in FIG. 2A. A driving member 16a is placed in a cursor 16x. A pinion 16d disposed in the cursor 16x may be intermeshed with a rack 16c disposed on a guide rail 14x to move the cursor 16x on the guide rail 14x. The cursor 16x located on the Y-axis also may be moved on the guide rail 14y by driving a string member through a driving member provided on the cursor 16y or a driving member may be provided in the cursor itself. There is formed an opening 17 in the cursor 16y on the Y-axis which corresponds to the cross section of the vertical rod 4. The vertical rod 4 is liftably inserted into and engaged with the opening 17.

The above-mentioned position control means 11 of a position control robot is constructed so as to have a suitable structure in order to transfer loads to a predetermined operation zone which corresponds to the operation zone attained by the robot. As to the construction of the position control robot, since the weight is supported by one of the robots 10, the position control robot 11 may be formed to have such a structure as have strength enough for absorbing inertia produced in driving the cursors 16x and 16y and the like.

Figure 10:
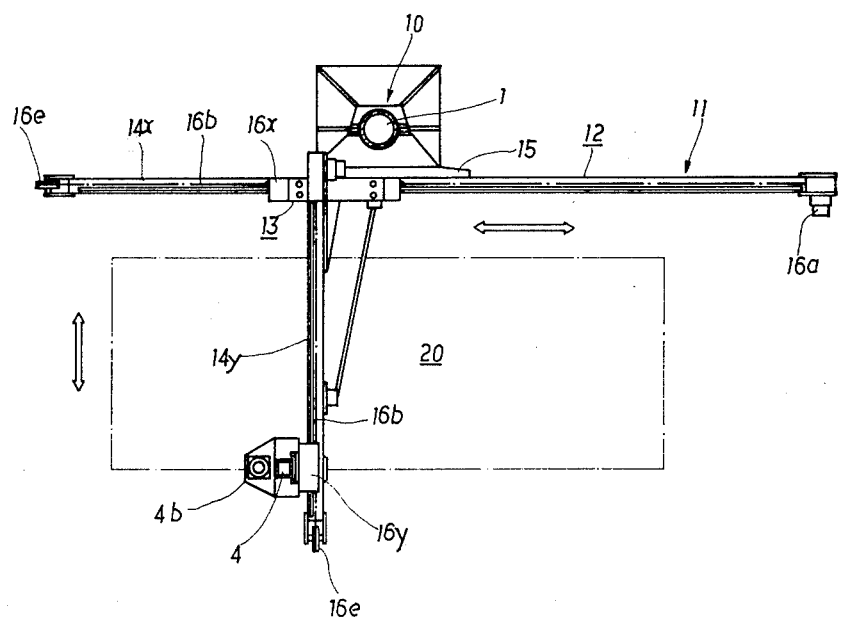
FIGS. 8 to 10 show in detail the robot shown in FIG. 2.
Figure 8:
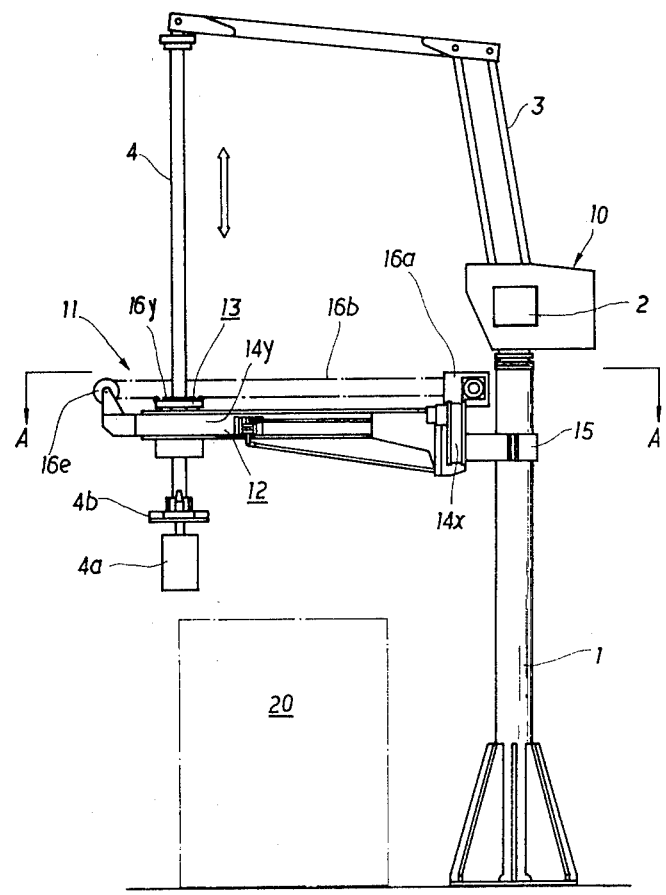
Figure 9:
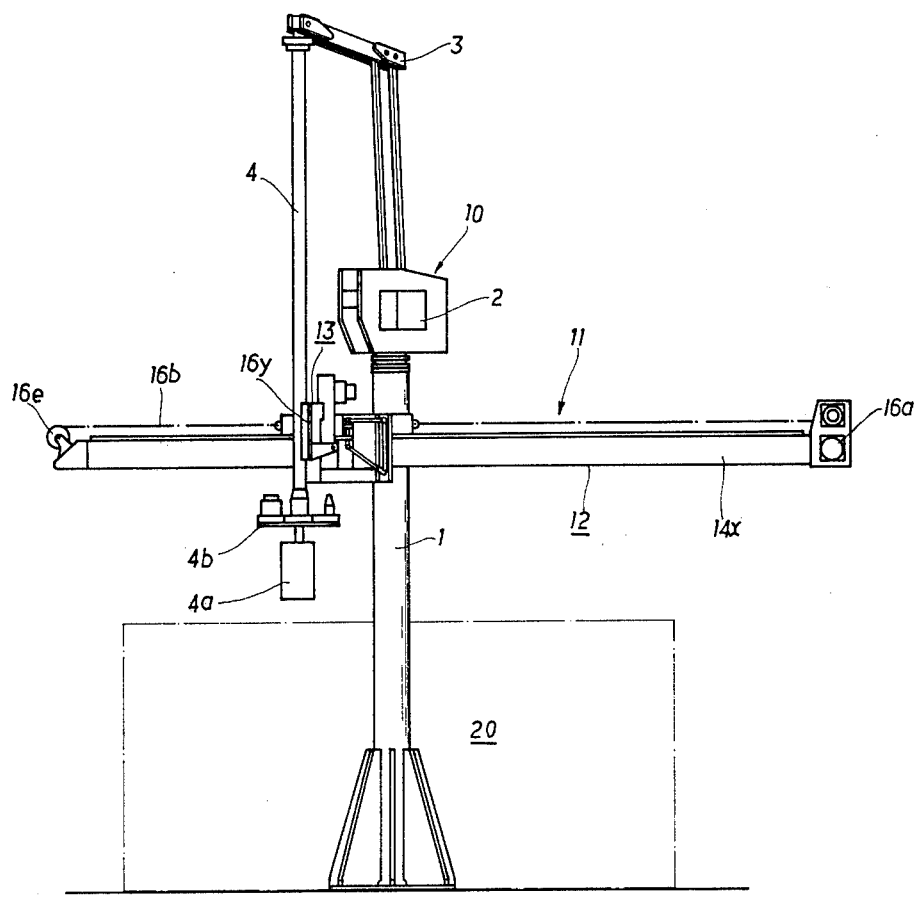

Referring now to FIGS. 8 to 10 illustrating the embodiment shown in FIG. 2 in more detail. FIG. 8 is a side view, FIG. 9 is a front view and FIG. 10 is a plan view. With reference to each of the Figures, a position control robot 11, at a forward position thereof, is attached to a weight control robot 10 by means of a support member 15. Illustratively stated, the attachment of the position control robot 11 to the weight control robot is done in such a manner that a guide rail 14x extending in a X-axis direction is connected to a strut member 1 by a supporting portion of a support member 15. Cursors 16x, 16y are placed respectively on guide rails 14x, 14y. Each of these cursors 16x, 16y is moved on each of the guide rails 14x, 14y by a pulling action of a string member 16b wound in a loop on a pulley 16e placed at one end of each of the guide rails and on a driving member 16a placed at the other end of the guide rails. These guide rails 14x, 14y are respectively formed by placing a known type rail on a hollow and light-weight member. A vertical rod 4 is made of a cylindrical or square bar type light-weight member, further provided with a rotation preventing mechanism and liftably engaged with the cursor 16y. To a lower end of the vertical rod 4 is detachably attached an optionally selected operating portion 4a through a rotation adjustable support disk 4b. In each of the Figures above, the reference numeral 20 indicates an operating zone of a lifting portion 4.

There will be explained the operation of the robot in the above-mentioned embodiment hereinbelow.

The lifting operation for carrying out positioning in the vertical direction of a lifting portion 4 which is an end portion of an arm in the form of a vertical rod is done in response to an order from a control means 5 through a driving means 2. The horizontal movement of the lifting portion 4 is done in such a manner that a programmed operational data is given to a driving control means 13 and cursors 16x, 16y are respectively moved on guide rails 14x, 14y. Namely, when the cursors 16x, 16y are respectively moved on the guide rails 14x, 14y in the directions as shown by ⟵⟶ X, ⟵⟶ Y, the lifting portion 4 engaged with the cursor 16y is also moved in the same direction. The horizontal movement of the vertical rod of the lifting portion is carried out in such a manner that the driving means 2 as a weight control means 10 rotates and an operating arm 3 is extended and simultaneously the driving control means 13 of a position control means 11 is operated. As mentioned above, it is noted that according to the present invention, just below the engaging portion of the lifting portion 4 of the weight control means 10 and the position control means 11, an operating portion 4a is disposed in a suspended fashion, said engaging portion is adjustably moved and then said operating portion 4a is moved the same distance in the same direction as that of the engaging portion to make a precise positioning control of the end position.

Figure 3:
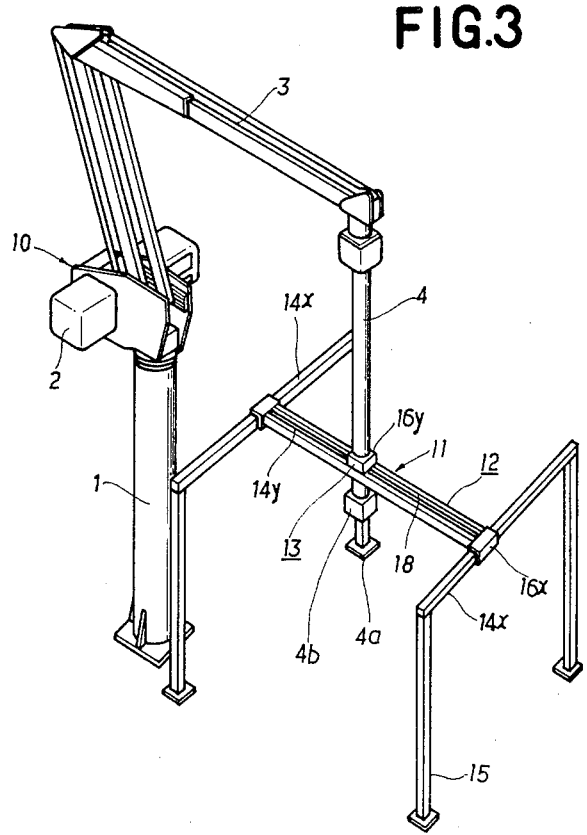

Now, there will be described another embodiment of the present invention. The embodiment illustrated in FIG. 3 is another form of a position control means of the present invention. A guide means 12 of a position control means 11 comprises two guide rails 14x extending in a X-axis direction and a guide rail 14y extending in a Y-axis direction and mounted slidably in the X-axis direction on the guide rails 14x at both ends thereof through two cursors 16x. The guide rails 14y has a slit 18 extending longitudinally thereof and into which a lifting portion 4 is inserted and a cursor 16y engaging with the lifting portion 4 slides in the horizontal direction in the slit formed on the guide rail 14y together with the lifting portion 4. The two guide rails 14x are supported by a support member 15 constituted by four struts. The lifting portion 4 is inserted into the slit 18 formed on the guide rail 14y through an opening formed in the cursor 16y and moved in the vertical direction in a restricted condition, namely, inserted in the opening.

There will be shown plan views of other forms of a position control robot of the present invention in FIGS. 4 to 6.

With reference to FIG. 4, a guide means 12 of a position control means is constructed by a guide rail 14y extending in a Y-axis direction. Said guide rail 14y is attached directly to a weight control robot 10 by means of a support member 15. On the guide rail 14y is disposed a cursor 16y. A through-hole is formed in the cursor 16y. Through said through-hole, a lifting portion 4 of a vertical rod is inserted into a slit 18 formed on the guide rail 14y and slides in the horizontal direction in the slit 18. In the through hole of the cursor 16y, a thrust bearing is accommodated in order to smoothly lift or lower the vertical rod 4 therein.

With reference to FIG. 5, a guide means comprises a guide rail 14 extending in a X-axis direction and a support member 15. A driving control means 13 comprising a cursor 16x is mounted on the guide rail 14. A position control means 11 is constituted by both the means of the guide means 12 and the driving control means 13.

With reference to FIG. 6, two guide rails 14y extending in a Y-axis direction are constructed as a frame and a guide rail 14x extending in a X-axis direction is slidably mounted in the horizontal direction to both the guide rails 14y through two cursors 16y, 16y.

Figure 7:
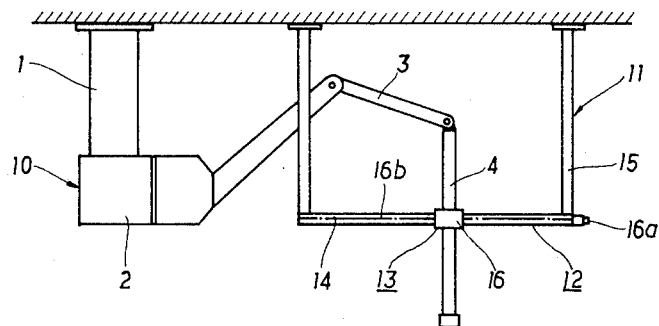
FIG. 7 is a side view showing the installation of the present invention to the ceiling.

Referring to FIG. 7, there is shown another embodiment in which a weight control means 10 as a weight control robot associated with a position control means 11 as a position control robot are installed on the ceiling and both the robots are controlled to lift or lower a vertical rod 4 and move the rod 4 in a horizontal direction, whereby various types of operations may be done.

With such construction of the present invention, when a load is transferred to a predetermined position, the functions of the robots are separated into two. One function is born by one of the robots and the other function is performed by the other, i.e. one robot carries out a lifting operation and the other robot carries out a horizontally movement operation. These two robots are designed to be mechanically mated with each other to control the positioning of the end operating portion, so that load can be transferred to a predetermined position with accuracy and rapidity. As the robot is optionally assembled, the guide means of the position control means permits the end operating portion of the robot to operate within any operating region with high accuracy. In addition, according to the present invention, since the end operating portion is constructed by a vertical rod, a precise positioning control in the vertical direction can be also carried out.

What is claimed is:

1. An end position control robot, comprising: a main body; weight control means mounted on said main body, said weight control means comprising driving means mounted on said main body, an operating arm connected to said drive means for being moved with respect to said body and lifting means mounted on said operating arm for supporting a load and for moving said load vertically; position control means mounted in fixed position relative to said main body, said position control means comprising horizontal guide means and driving control means movable horizontally along said guide means to a selectable position thereon, said lifting means being coupled to said driving control means so that said lifting means can be operated to move a load vertically independently of said driving control means and so that said lifting means is movable horizontally by movement of said driving control means along said horizontal guide means.

2. An end position control robot according to claim 1, wherein said lifting means is a vertical rod which is connected to an end portion of said operating arm, said operating arm being a link arm suspended from said main body, said guide means comprising a guide rail, said driving control means comprising a cursor slidably mounted on said guide rail and driving means for moving said cursor along said guide rail, said vertical rod being engaged with said cursor so that said rod can be moved vertically relative to said cursor and so that said rod is moved horizontally by said cursor as it moves along said guide rail.

3. An end position control robot according to claim 1, wherein said guide means comprises first and second horizontal guide rails mounted at right angles to each other, first cursor means on said first guide rail, said first cursor means being slidably mounted on said second guide rail so that said first guide rail can be moved lengthwise along said second guide rail, a second cursor slidably mounted on said first guide rail, said lifting means comprising a vertical rod which engages said second cursor so that said rod can be moved vertically relative to said second cursor and so that said rod is moved horizontally by said second cursor.

4. An end position control robot according to claim 1, wherein said guide means comprises a guide rail, and support means for supporting said guide rail, in a forward position of the weight control means, in a horizontal plane.

5. An end position control robot according to claim 1, wherein said driving control means comprises a cursor, a driving member, a string member and a pulley, said driving member being fixed at one end of said guide means and said pulley being mounted on the other end of said guide means, said string member extending between both said driving member and said pulley and being connected to said cursor so that said cursor is moved along said guide means to a predetermined position by driving said driving means in either direction.

6. An end position control robot according to claim 1, wherein said driving control means comprises a cursor, a driving member, a rack, and a pinion, said rack being mounted on said guide means, said cursor being mounted on said driving member and being connected to said pinion so that rotation of said pinion moves said cursor along said guide means.

* * * * *